March 28, 1967  L. P. GARVEY  3,310,929

MOLDING AND CLIP ASSEMBLY

Filed July 13, 1964

INVENTOR.
Louis P. Garvey
BY
Paul Fitzpatrick
ATTORNEY

United States Patent Office 3,310,929
Patented Mar. 28, 1967

3,310,929
MOLDING AND CLIP ASSEMBLY
Louis P. Garvey, Birmingham, Mich., assignor to General Motors Corporation, Detroit, Mich., a corporation of Delaware
Filed July 13, 1964, Ser. No. 382,152
4 Claims. (Cl. 52—717)

This invention relates to an assembly for fastening a molding strip to a panel.

There is a definite need for a suitable fastening means to secure a molding strip to a panel in such a manner that the securement means are not visible on the molding side of the panel. This need is especially prevalent in the automobile industry where there are many applications of molding strips to body panels which require suitable fastening means that are not visible on the outer portion of the car. A frequent problem occurs when the molding is a die cast structure of exceptional length as it is well known that such structures are subject to considerable shrinkage thereby resulting in location and fastening problems. These problems often result from the shrinkage of the molding casting, from misalignment of body panel holes, or by the body panel itself being misaligned in assembly. The subject invention has been conceived to overcome the above-mentioned problems occurring in the location and securement of a molding to a body panel.

Therefore, it is an object of the subject invention to provide an assembly for fastening a die-cast molding structure to the body panel of an automobile which compensates for the location and securement problems existing in connection with commonly known fastening assemblies.

It is another object of the subject invention to provide an assembly for fastening a molding to a body panel which is simple in structure, and yet effective in providing a secure connection which is not visible from the outer portion of the body panel.

Other objects, features, and advantages of the subject invention will become obvious upon reference to the following detailed description of the preferred embodiment as shown in the attached drawings, wherein.

Although the subject invention is shown and described in its preferred embodiment, namely, holding a rocker panel molding to a body panel in an automobile, it should be clear that it could be adapted to many applications where it is desired to fasten a molding piece to a panel member.

Figure 1:
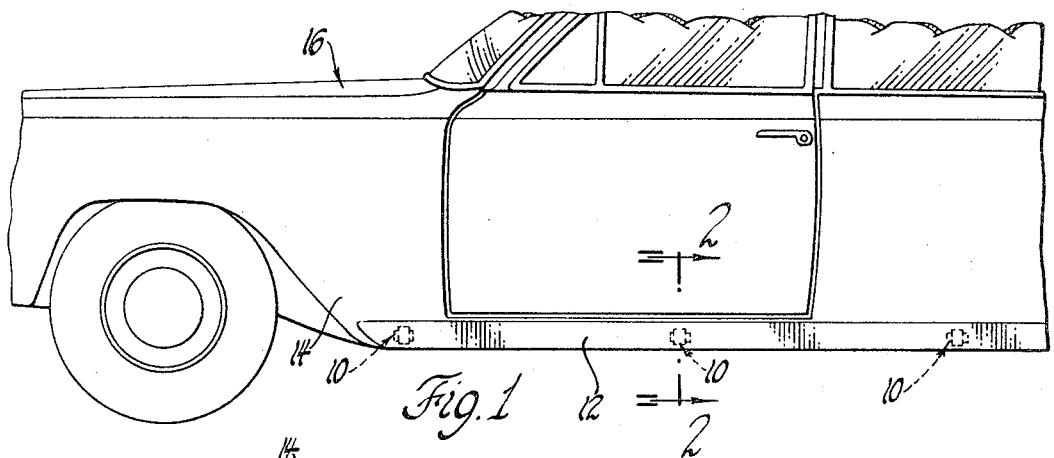
FIGURE 1 shows the subject invention as applied to fastening a rocker panel molding to a body panel of an automobile.

Specifically, FIGURE 1 shows the subject fastener assembly 10 holding a rocker panel molding 12 to the body panel 14 of an automobile 16. It should be noted that the spacing of the assembly units 10 will be a function of the strength requirements of the connection between the rocker panel molding 12 and the body panel 14.

Figure 2:
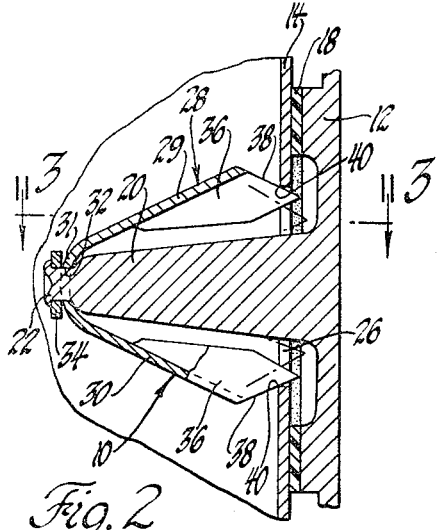
FIGURE 2 is a side sectional view as taken in the direction of arrows 2—2 of FIGURE 1 showing the subject assembly holding the rocker panel molding to the body panel.
Figure 3:
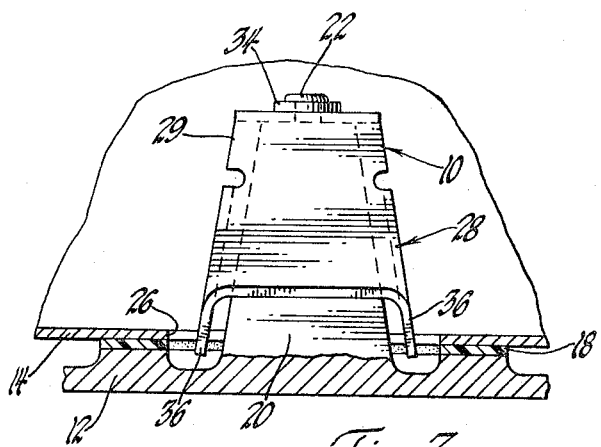
FIGURE 3 is a top view taken in the direction of arrows 3—3 in FIGURE 2.
Figure 4:
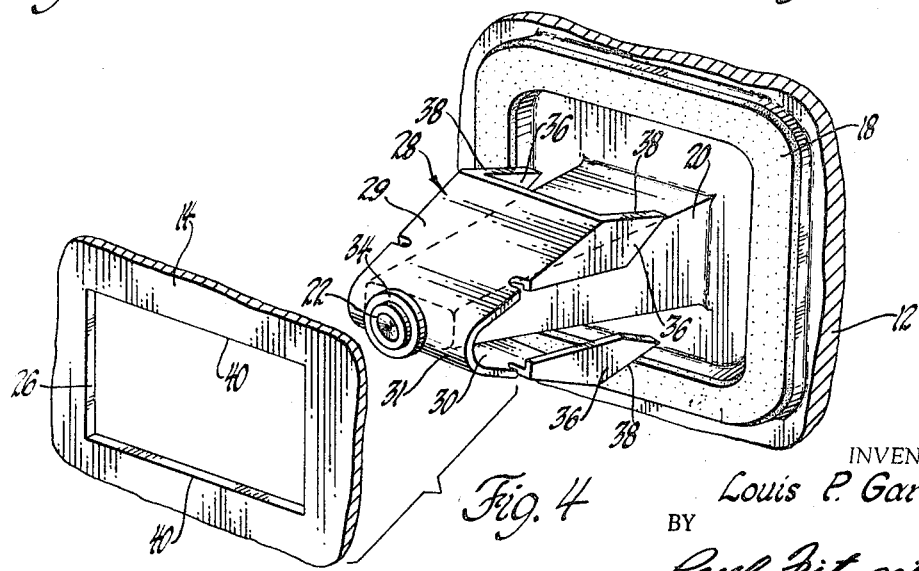
FIGURE 4 is a perspective view showing the subject assembly separated from the body panel assembly.

The component parts of the subject assembly are better seen in FIGURE 2. The molding 12 is seen in FIGURE 2 to be separated from the body panel 14 by a layer of sealer material 18, which seals the subject assembly from water and other elements thereby reducing the possibility of corrosion in the area of the assembly. The sealer material 18 also provides a cushioning effect between the molding 12 and the body panel 14 to thereby reduce the possibility of damage to the respective parts being fastened together. A stud 20 is cast integrally with the molding 12 and extends perpendicularly therefrom. It is seen in FIGURE 2 that the stud 20 has a reduced area head portion 22 which is capable of being upset, as by peening. It is seen that the body panel 14 has an opening 26 therein which provides a passage so that the stud 20 can be inserted through the body panel 14. The opening 26 is somewhat larger than the stud 20 so that there is ample room to adjust the position of the molding to compensate for positioning errors and shrinkage. As best seen in FIGURE 4, a generally U-shaped spring clip 28 with a pair of legs 29 and 30 and a curved center portion 31 has an aperture 32 therethrough and is received over the neck portion 22 of the stud 20 and held there by a washer 34 and the upset head portion 24 of the stud 20. This results in a very loose connection and allows the spring clip 28 to pivot on and with respect to the stud 20 to further compensate for misfitting. Each leg of the U-shaped spring clip 28 has a pair of wings 36 at its outer extremity. As seen in FIGURE 2 the wings 36 have camming surfaces 38 which are spring biased against the edges 40 of the opening 26 in the panel 14 to force the molding strip 12 against the panel 14. Thus the biasing of the spring clip 28 between the panel 14 and the upset head portion 22 of the stud 20 forces and holds the molding 12 against the panel 14. It should also be noted that the stud 20 extends a sufficient distance beyond the panel 14 so that the spring clip 28 can pivot relative to the stud 20 and its wings 36 can move within the opening 26 to compensate for variations in alignment between the panel 14 and the molding strip 12. It is this compensating action of the subject device which allows it to overcome the alignment problems resulting from shrinkage and positioning error.

Hence it should be clear that the subject invention provides a relatively simple, yet effective, method of fastening a molding strip to a panel member.

Although the subject invention has been illustrated in connection with the preferred embodiment thereof, it should be obvious to those skilled in the art to which this invention pertains that many changes and modifications may be made without departing from the scope of the invention.

I claim:
1. An assembly for fastening a molding strip to a panel capable of compensating for misalignment of the molding strip and the panel comprising:
   a stud formed integrally with and extending from said molding strip through an opening in said panel, said opening in said panel being larger than said stud to allow said molding to vary in position relative to said panel, said stud having an end portion at a distance from said molding, the length of said stud being at least as great as the size of said opening in said panel;
   a U-shaped spring clip loosely retained on the said end portion of said stud and having clearance from the remainder of said stud so that it can pivot freely relative to said stud to compensate for misalignment between said molding strip and said panel, and means providing a swivel connection between said clip and said stud said spring clip including a pair of wing-shaped legs biased into said opening between said panel and said stud to secure said molding strip to said panel.

2. An assembly for fastening a molding strip to a panel capable of compensating for misalignment of the molding strip and the panel comprising:
   a stud formed integrally with and extending from said molding strip through an opening in said panel, said opening in said panel being larger than said stud to allow said molding to vary in position relative to said panel, said stud having an end portion at a distance from said molding, the length of said stud being at least as great as the size of said opening in said panel; and a U-shaped spring clip loosely retained on the said end portion of said stud and having clearance from the remainder of said stud so that it can pivot freely relative to said stud to compensate for misalignment between said molding strip and said panel, said spring clip including a pair of wing-shaped legs biased into said opening between said panel and said stud to secure said molding strip to said panel, and the end portion of said stud being upset to hold said spring clip on said stud and to force said molding strip against said panel.

3. An assembly for fastening a molding strip to a panel capable of compensating for misalignment of the molding strip and the panel comprising:

- a stud formed integrally with and extending from said molding strip through an opening in said panel, said opening in said panel being larger than said stud to allow said molding strip to vary in position relative to said panel, said stud having an end portion at a distance from said molding, the length of said stud being at least as great as the size of the opening in said panel;
- a U-shaped spring clip having a pair of legs connected by a curved central portion, said spring clip being loosely retained on the said end portion of said stud by means of an aperture in the center portion of said spring clip which is positioned over said end portion of said stud, the clip having clearance from the remainder of said stud, said loose connection and clearance allowing said spring clip to pivot relative to said stud to compensate for misalignment between said molding strip and said panel, said legs of said spring clip having wing portions extending into the opening in said panel to bias themselves between said panel and said stud, and the end portion of said stud being upset to hold said spring clip on said stud and to force said molding strip against said panel.

4. An assembly for fastening a molding strip to a panel capable of compensating for misalignment of the molding strip and the panel comprising:

- a stud formed integrally with and extending from said molding strip through an opening in said panel, said opening in said panel being larger than said stud to allow said molding strip to vary in position relative to said panel, said stud having an end portion at a distance from said molding, the length of said stud being at least as great as the size of the opening in said panel;
- a U-shaped spring clip having a pair of legs connected by a curved central portion, said spring clip being loosely retained on the said end portion of said stud by means of an aperture in the center portion of said spring clip which is positioned over said end of portion of said stud, the clip having clearance from the remainder of said stud, said loose connection and clearance allowing said spring clip to pivot relative to said stud to compensate for misalignment between said molding strip and said panel, said legs of said spring clip having wing portions extending into the opening in said panel to bias themselves between said panel and said stud;
- and a washer fixed on said end portion of said stud over said spring clip, and the end portion of said stud being upset to hold said spring clip and washer on said stud thereby biasing said spring clip between said panel and said washer to force said molding strip against said panel.

References Cited by the Examiner
UNITED STATES PATENTS

| | | | |
|---|---|---|---|
| 3,018,530 | 1/1962 | Pender | 24—73 |
| 3,080,629 | 3/1963 | Meyer | 24—73 |
| 3,093,874 | 6/1963 | Rapata | 24—73 |
| 3,200,551 | 8/1965 | Jakeway | 52—511 |
| 3,214,878 | 11/1965 | Duffy et al. | 52—717 |

FRANK L. ABBOTT, *Primary Examiner.*

RICHARD W. COOKE, Jr., *Examiner.*

R. S. VERMUT, *Assistant Examiner.*